(12) United States Patent
Yoshino et al.

(10) Patent No.: US 8,452,100 B2
(45) Date of Patent: May 28, 2013

(54) IMAGE PROCESSING APPARATUS, IMAGE FORMING APPARATUS AND IMAGE READING APPARATUS INCLUDING THE SAME, AND IMAGE PROCESSING METHOD

(75) Inventors: Hiroki Yoshino, Yamatokoriyama (JP); Makoto Hayasaki, Tokyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 1343 days.

(21) Appl. No.: 12/178,464

(22) Filed: Jul. 23, 2008

(65) Prior Publication Data

US 2009/0028436 A1    Jan. 29, 2009

(30) Foreign Application Priority Data

Jul. 24, 2007   (JP) ............................... P2007-192643

(51) Int. Cl.
*G06K 9/64* (2006.01)
(52) U.S. Cl.
USPC ........... 382/190; 382/176; 382/177; 382/180; 382/218
(58) Field of Classification Search
USPC .......................... 382/176, 180, 190, 177, 218
See application file for complete search history.

(56) References Cited

U.S. PATENT DOCUMENTS

| | | | |
|---|---|---|---|
| 5,363,212 A * | 11/1994 | Taniuchi et al. ............... | 358/452 |
| 5,465,353 A | 11/1995 | Hull et al. | |
| 2007/0140560 A1 * | 6/2007 | Katsuyama et al. .......... | 382/176 |
| 2007/0154112 A1 * | 7/2007 | Tanaka ......................... | 382/284 |
| 2007/0253623 A1 | 11/2007 | Ohira et al. | |

FOREIGN PATENT DOCUMENTS

| | | |
|---|---|---|
| EP | 1 914 680 A1 | 4/2008 |
| JP | 7-282088 A | 10/1995 |
| JP | 2006-344233 A | 12/2006 |
| JP | 2007-299210 A | 11/2007 |
| WO | WO-2006/092957 A1 | 9/2006 |

* cited by examiner

*Primary Examiner* — Brian Q Le
*Assistant Examiner* — Michael Vanchy, Jr.
(74) *Attorney, Agent, or Firm* — Birch, Stewart, Kolasch & Birch, LLP

(57) ABSTRACT

A feature point calculating section binarizes the image data to obtain a centroid of a consecutive component in which pixels are connected as a feature point, reverses the image data, obtains a centroid as a feature point from the reversed image data similarly, and adds them as a feature point of the image data. A features calculating section calculates a predetermined invariant based on the feature point containing the feature point obtained from the reversed image data, and calculates a hash value based on the predetermined invariant. A vote process section retrieves a hash table based on the calculated hash value, votes for a document of an index stored in association with the hash value, and accumulatively adds the vote. A similarity determination process section compares the number of votes calculated by the vote process section with a predetermined threshold value to determine a similarity.

8 Claims, 17 Drawing Sheets

FIG. 4

| -3 | -2 | -1 | 1  | -1 | -2 | -3 |
|----|----|----|----|----|----|----|
| -2 | -2 | 1  | 4  | 1  | -2 | -2 |
| -1 | 1  | 8  | 15 | 8  | 1  | -1 |
| 1  | 5  | 16 | 25 | 16 | 5  | 1  |
| -1 | 1  | 8  | 15 | 8  | 1  | -1 |
| -2 | -2 | 1  | 4  | 1  | -2 | -2 |
| -3 | -2 | -1 | 1  | -1 | -2 | -3 |

PREVIOUS PROCESSED LINE ⟶

PROCESSING LINE ⟶

CURRENT PIXEL

| LABEL | TABLE VALUE |
|-------|-------------|
| 1 | 1 |
| 2 | 2 |
| 3 | 1 |
| ... | ... |

FIG. 10A

| SELECT DOCUMENT MODE | |
|---|---|
| NORMAL TEXT DOCUMENT | REVERSE TEXT DOCUMENT |

FIG. 10B

| SELECT DOCUMENT MODE | |
|---|---|
| NORMAL TEXT DOCUMENT<br>A | REVERSE TEXT DOCUMENT<br>A |

FIG. 10C

| SELECT DOCUMENT MODE | |
|---|---|
| NORMAL TEXT DOCUMENT<br>DETAIL | REVERSE TEXT DOCUMENT<br>DETAIL |

FIG. 10D

| CONTAIN FOLLOWING TEXT? | |
|---|---|
| NORMAL TEXT DOCUMENT<br>JAPAN | |
| YES | NO |

FIG. 10E

| CONTAIN FOLLOWING TEXT? | |
|---|---|
| REVERSE TEXT DOCUMENT | JAPAN |
| YES | NO |

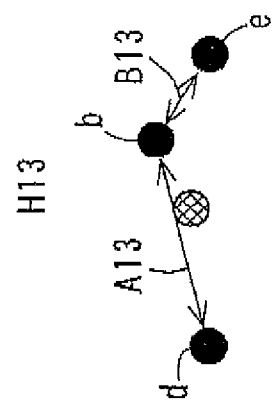
FIG. 14C
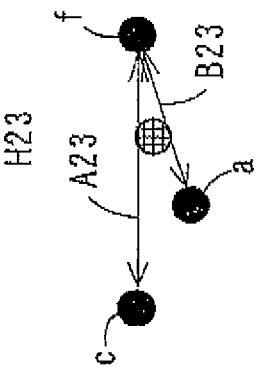
FIG. 14F
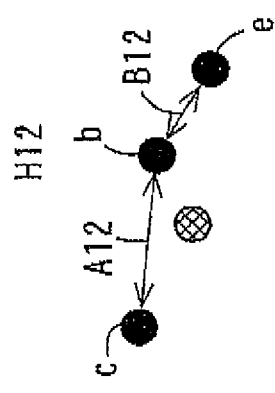
FIG. 14B
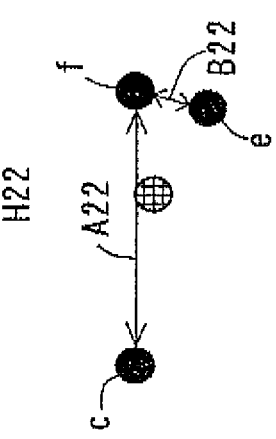
FIG. 14E
FIG. 14A
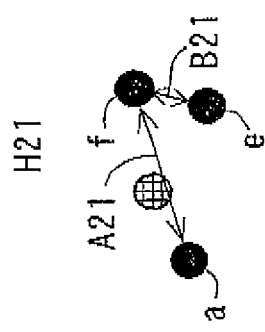
FIG. 14D

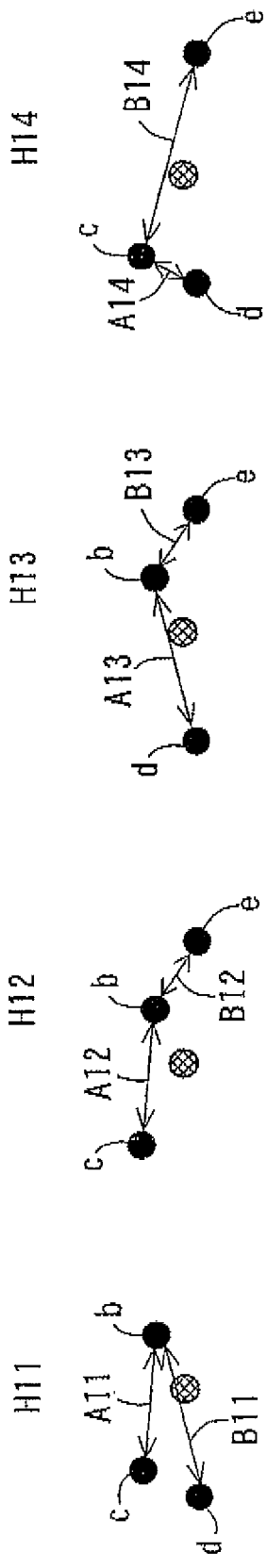
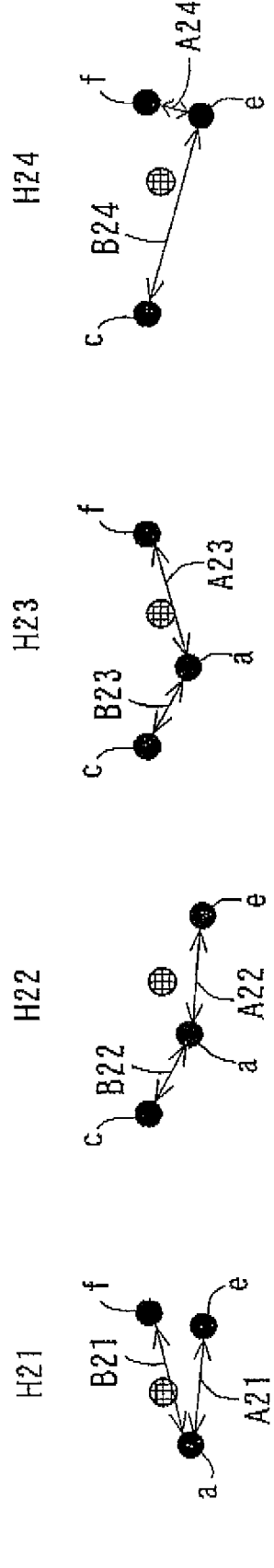
FIG. 15A  FIG. 15B  FIG. 15C  FIG. 15D
FIG. 15E  FIG. 15F  FIG. 15G  FIG. 15H

FIG. 16A

| HASH VALUE | INDEX INDICATIVE OF DOCUMENT |
|---|---|
| H1 | ID1 |
| H2 | ID1 |
| H3 | ID1, ID2 |
| H4 | ID1 |
| H5 | ID1 |
| H6 | ID1, ID2 |
| ⋮ | ⋮ |

FIG. 16B

| HASH VALUE | INDEX INDICATIVE OF DOCUMENT |
|---|---|
| H1 | ID1, ID2 |
| H2 | ID1 |
| H3 | ID1, ID2 |
| H4 | ID1 |
| H6 | ID1, ID2 |
| ⋮ | ⋮ |

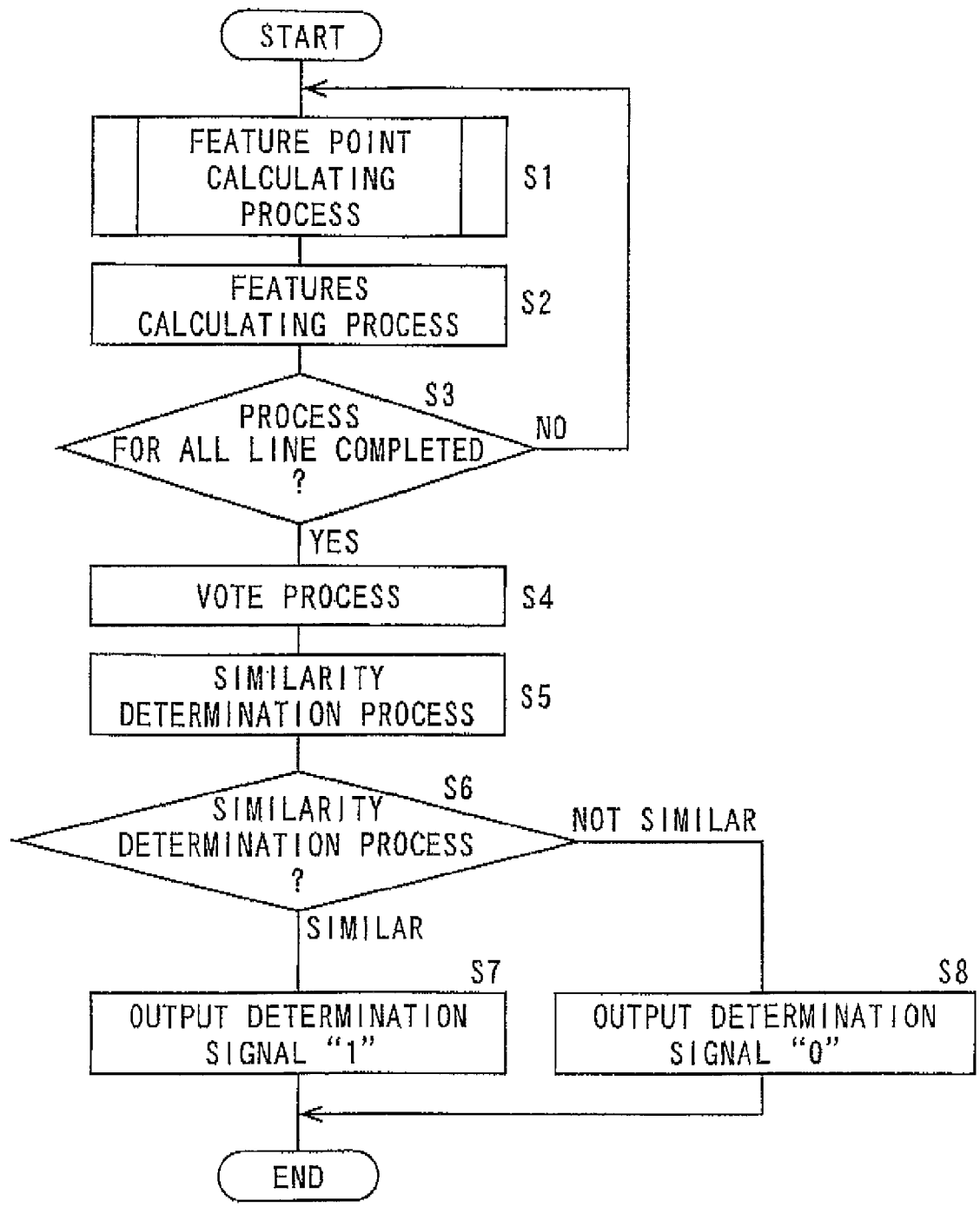

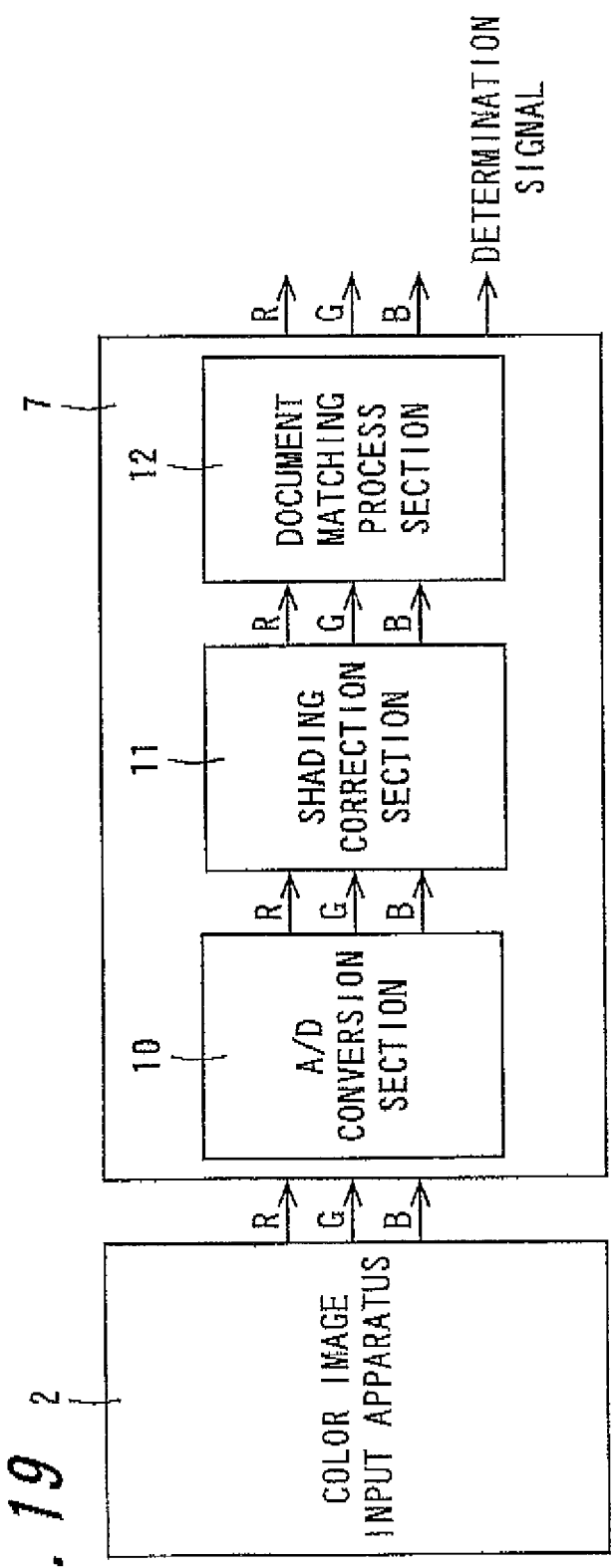

IMAGE PROCESSING APPARATUS, IMAGE FORMING APPARATUS AND IMAGE READING APPARATUS INCLUDING THE SAME, AND IMAGE PROCESSING METHOD

CROSS-REFERENCE TO RELATED APPLICATION

This application claims priority to Japanese Patent Application No. 2007-192643, which was filed on Jul. 24, 2007, the contents of which are incorporated herein by reference in its entirety.

BACKGROUND OF THE INVENTION

1. Field of the Invention

The present invention relates to an image processing apparatus for determining a similarity between input image data and image data which has been stored in advance, an image forming apparatus and an image reading apparatus including the same, and an image processing method.

2. Description of the Related Art

There has been proposed an image processing method in which a document image is read with a scanner, image data obtained by reading the document image is matched to image data which has been stored in advance, and a similarity between the former image data and the latter image data is determined. For example, a method in which a keyword is extracted from a document image with an OCR (Optical Character Reader) to determine a similarity of image data by the extracted keyword, and a method in which an image a similarity of which is to be determined is limited to a form image with ruled line and features of the ruled line are extracted to determine a similarity of image data, and the like have been proposed.

Japanese Unexamined Patent Publication JP-A 7-282088 (1995) discloses a matching apparatus wherein a descriptor is generated from features of an input document, and using the descriptor and a descriptor database, the input document is matched against documents in a document database.

Herein, the descriptor database denotes a database in which a list of documents containing features from which descriptors are generated and the descriptors are stored. Furthermore, the descriptor is selected to be invariant to distortions caused by digitizing the documents or differences between the input document and a matched document in the document database.

Votes are accumulated for each document in the document database when the descriptor database is scanned, in which one document which accumulates the most votes, or the document with more than a threshold number of votes is determined as the matching document.

The matching apparatus described in JP-A 7-282088 covers document images composed of a black text and a color text with white or low-density background, and document images composed of a white text, so-called reverse text with colored background can not be extracted, thus determination accuracy is deteriorated when document images contain a reverse text.

SUMMARY OF THE INVENTION

An object of the invention is to provide an image processing apparatus capable of determining, even when image data contains a reverse text, a similarity of the image data and image data which has been stored in advance with high accuracy, an image forming apparatus and an image reading apparatus including the same, and an image processing method.

The invention provides an image processing apparatus comprising:

a first feature point calculating section for specifying a consecutive component in which pixels are connected based on document image data, and extracting a feature point in the specified consecutive component;

a reverse process section for obtaining image data that a pixel value of the document image data is reversed;

a second feature point calculating section for specifying a consecutive component in which pixels are connected based on the image data that the document image data is reversed, and extracting a feature point in the specified consecutive component;

a feature point adding section for adding the feature point calculated by the first feature point calculating section and the feature point calculated by the second feature point calculating section;

a features calculating section for obtaining features of the document image data based on the feature point added in the feature point adding section;

a storage section for storing in advance the calculated features and the document image in association with each other; and a similarity determining section for determining, based on the features obtained by the features calculating section and features of a document image which has been stored in advance, whether or not the document image and the stored document image are similar to each other.

According to the invention, a first feature point calculating section specifies a consecutive component in which pixels are connected based on document image data, and extracts a feature point in the specified consecutive component. On the other hand, a reverse process section obtains image data that a pixel value of the document image data is reversed, and a second feature point calculating section specifies a consecutive component in which pixels are connected based on the image data that the document image data is reversed, and extracts a feature point in the specified consecutive component.

A feature point adding section adds the feature point calculated by the first feature point calculating section and the feature point calculated by the second feature point calculating section, and a features calculating section obtains features of the document image data based on the feature point added in the feature point adding section. A storage section stores the calculated features and the document image in association with each other in advance, and a similarity determining section determines, based on the features obtained by the features calculating section and features of a document image which has been stored in advance, whether or not the document image data and the stored document image are similar to each other. A document image may be stored as an index indicative of the document image, and further may be stored so that the index indicative of the document image and image data of the document image are associated with each other.

As a result, it is possible to determine, even when image data contains a reverse text, a similarity of the image data and image data which has been stored in advance with high accuracy.

Furthermore, in the invention, it is preferable that the storage section stores the features obtained by adding the feature point of the document image data and the feature point calculated by the image data that the document image data is reversed, differently from features calculated based on features obtained without reversing the document image data.

According to the invention, the storage section stores the features obtained by adding the feature point of the document image data and the feature point calculated by the image data that the document image data is reversed, differently from features calculated based on features obtained without reversing the document image data.

Thus, retrieved objects at the time of performing similarity determination are separated, resulting that it is possible to improve processing speed.

Furthermore, in the invention, it is preferable that the similarity determining section performs the determination based on a signal indicating whether or not the image data that the document image data is reversed is used.

According to the invention, the similarity determining section performs the determination based on a signal indicating whether or not the image data that the document image data is reversed is used.

Thus, the process is performed only for a document image containing a reverse text, resulting that it is possible to perform the determination process quickly without performing unnecessary process for a document image containing no reverse text.

Furthermore, in the invention, it is preferable that the image processing apparatus comprises a control section for controlling, based on the determination result from the similarity determining section, processing contents with respect to the document image data, including copying, electronic distribution, facsimile transmission, and a filing of the document image data.

According to the invention, based on the determination result, it is possible to perform a control including an inhibition of copying and electronic distribution of the document image, an inhibition of facsimile transmission, a filing of the document image, and so on.

Furthermore, the invention provides an image forming apparatus including the image processing apparatus mentioned above.

According to the invention, in an image forming apparatus such as a digital copying machine and a multi-function peripheral, even when a read document image or image data transmitted from a host computer contains a reverse text, it is possible to determine a similarity with a document image which has been stored in advance with high accuracy, and to perform a control, including an inhibition of copying, printing and electronic distribution of the document image, an inhibition of facsimile transmission, a filing of the document image.

Furthermore, the invention provides an image reading apparatus including the image processing apparatus mentioned above.

According to the invention, in an image reading apparatus such as a scanner and a digital camera, even when a read document image or picked-up image data contains a reverse text, it is possible to determine a similarity with an image which has been stored in advance with high accuracy, and to perform a control, including transmission of the document image (transmission to a computer, a printer and the like), an inhibition of electronic distribution, an inhibition of facsimile transmission, a filing of the document image, and so on.

In this way, the similarity determination process is also performed for the document image containing a reverse text, resulting that it is possible to provide an image forming apparatus and an image reading apparatus with high versatility.

Furthermore, the invention provides an image processing method comprising:

a first feature point calculating step of specifying a consecutive component in which pixels are connected based on document image data, and extracting a feature point in the specified consecutive component;

a reverse process step of obtaining image data that a pixel value of the document image data is reversed;

a second feature point calculating step of specifying a consecutive component in which pixels are connected based on the image data that the document image data is reversed, and extracting a feature point in the specified consecutive component;

a feature point adding step of adding the feature point calculated at the first feature point calculating step and the feature point calculated at the second feature point calculating step;

a features calculating step of obtaining features of the document image data based on the feature point added at the feature point adding step; and a similarity determining step of determining, based on the features obtained at the features calculating step and features of a document image which has been stored in advance, whether or not the document image and the stored document image are similar to each other.

According to the invention, at a first feature point calculating step, a consecutive component, in which pixels are connected, is specified based on document image data, and a feature point in the specified consecutive component is extracted. On the other hand, at a reverse process step, image data that a pixel value of the document image data is reversed is obtained, and at a second feature point calculating step, a consecutive component, in which pixels are connected, is specified based on the image data that the document image data is reversed, and a feature point in the specified consecutive component is extracted.

At a feature point adding step, the feature point calculated at the first feature point calculating step and the feature point calculated at the second feature point calculating step are added, and at a features calculating step, features of the document image data is obtained based on the feature point added at the feature point adding step. At a similarity determining step, based on the features obtained at the features calculating step and features of a document image which has been stored in advance, whether or not the document image and the stored document image are similar to each other is determined.

As a result, it is possible to determine, even when image data contains a reverse text, a similarity of the image data and image data which has been stored in advance with high accuracy.

Furthermore, there is provided an image processing program for causing a computer to function as the image processing apparatus.

Furthermore, there is provided a computer readable recording medium on which an image processing program for causing the computer to function as the image processing apparatus is recorded.

BRIEF DESCRIPTION OF THE DRAWINGS

Other and further objects, features, and advantages of the invention will be more explicit from the following detailed description taken with reference to the drawings wherein:

FIG. 4 is a view showing an example of a mixing filter;

FIGS. 10R to 10E are diagrams showing examples of questions in an interactive manner displayed on the operation panel;

FIGS. 14A to 14F are views showing calculating examples of invariants based on the current feature point;

FIGS. 15A to 15H are views showing other calculating examples of invariants based on the current feature point;

FIGS. 16A and 16B are views showing examples of a hash table;

FIG. 17 is a flowchart showing a document matching process;

FIG. 19 is a block diagram showing the structure of an image reading apparatus according to an embodiment of the invention.

DETAILED DESCRIPTION

Figure 1:
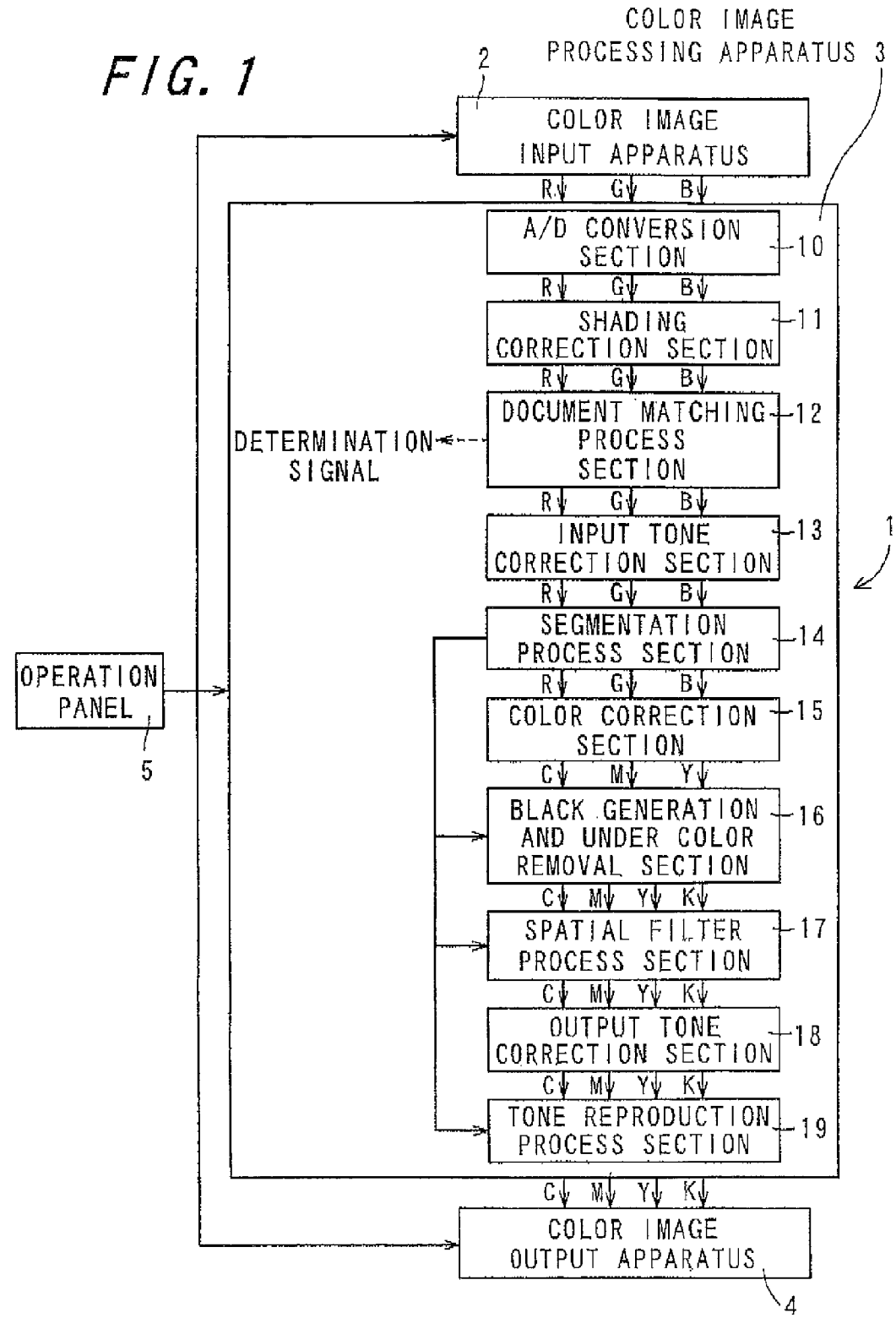
FIG. 1 is a block diagram showing the structure of an image forming apparatus including an image processing apparatus according to an embodiment of the invention.

Now referring to the drawings, preferred embodiments of the invention are described below.

FIG. 1 is a block diagram showing the structure of an image forming apparatus 1 provided with an image processing apparatus 3 according to an embodiment of the invention.

The image forming apparatus 1 is provided with a color image input apparatus 2, a color image processing apparatus 3, a color image output apparatus 4, an operation panel 5 for performing various kinds of operations, and the like. Image data of an analogue signal of RGB (R:red, G:green, B:blue) obtained by reading a document in the color image input apparatus 2, is outputted to the color image processing apparatus 2, subjected to predetermined processes in the color image processing apparatus 3, and outputted to the color image output apparatus 3 as a digital color signal of CMYK (C:cyan, M:magenta, Y:yellow, k:black).

The color image input apparatus 2 which is a scanner including, for example, a CCD (Charged Coupled Device) image sensor, reads a reflection light image from a document image as an analogue signal of RGB and outputs the read RGB signal to the color image processing apparatus 3. The color image output apparatus 4 is a printer employing an electrophotographic system or an inkjet system, which outputs image data of a document image on a recording paper. Moreover, the color image output apparatus 4 may be a display device such as a liquid crystal display.

The color image processing apparatus 3 includes various process sections, which will be described later, and is realized by an ASIC (Application Specific Integrated Circuit) and the like.

The color image processing apparatus 3 includes an A/D (analogue/digital) conversion section 10, a shading correction section 11, a document matching process section 12, an input tone correction section 13, a segmentation process section 14, a color correction section 15, a black generation and under color removal section 16, a spatial filter process section 17, an output tone correction section 18, and a tone reproduction process section 19.

The analogue color signal read by the color image input apparatus 2 is transmitted, in the color image processing apparatus 3, to the A/D conversion section 10, the shading correction section 11, the document matching process section 12, the input tone correction section 13, the segmentation process section 14, the color correction section 15, the black generation and under color removal section 16, the spatial filter process section 17, the output tone correction section 18, and the tone reproduction process section 19 in this order, and then outputted as a digital color signal of CMYK (C:cyan, M:magenta, Y:yellow, K:black) to the color image output apparatus 4.

The A/D conversion section 10 converts the input analogue color signal of RGB into a digital color signal as image data. The shading correction section 11 applies a process of removing a variety of distortions in the digital color signal of RGB transmitted from the A/D conversion section 10, which distortions occurred in a lighting system, an image focusing system, and an image sensing system of the color image input apparatus 2.

The shading correction section 11 also adjusts a color balance of RGB signal (RGB reflectivity signal), and simultaneously converts the RGB signal into a signal such as density (pixel value) signal that is easy for the color image processing apparatus 3 to handle.

The document matching process section 12 binarizes an input image, calculates a feature point in a consecutive component which is specified based on the binary image, and using the result, determines a similarity between the input image and a reference image (containing a document text image) which has been stored in advance. When the document matching process section 12 determines that these images are similar to each other, a classification signal which specifies a previously set process for the similar document is outputted and the predetermined process is carried out.

When it is determined that they are similar to each other, output control for the document image is performed. For example, copying of the document image, electronic distribution of the image data, and facsimile transmission are inhibited, or a filing of the image data is allowed. Alternatively, while copying of the document image, electronic distribution, and facsimile transmission are allowed, a log of process may be recorded to inform an administrator. Moreover, the document matching process section 12 outputs the input RGB signal without any modification to the input tone correction section 13 in the subsequent steps.

The input tone correction section 13 removes background color (density component of the background: background density) from the RGB signals whose processed by the shading correction section 11, and adjusts image quality such as contrast.

Based on the RGB signal, the segmentation process section 14 classifies each pixel of the input image data as a pixel which belongs to a plurality of areas such as a text area, a halftone area, a photograph continuous tone) area and a page-background area.

Then, based on the classification result, the segmentation process section 14 outputs a segmentation class signal indicating to which segmentation class the pixel belongs, to the black generation and under color removal section 16, the spatial filter process section 17, and the tone reproduction process section 19, and outputs the input signal without any modification to the color correction section 15 in the subsequent steps.

As the segmentation process, for example, in an n×m block (for example, 15×15 pixels) containing a current pixel, a maximum density difference which is a difference between a minimum density value (a minimum pixel value) and a maximum density value (a maximum pixel value) and a total density busyness which is defined as a summation of the absolute value of the density difference between adjacent pixels are calculated to compare with a plurality of predetermined threshold values, thus making it possible to classify the pixels into a page-background area, a photograph area, a text area, or a halftone area. In the invention, after each pixel is classified into each area, when a pixel belongs to the page-background area or the photograph area, it is determined that the pixel belongs to a non-edge area, and when a pixel belongs to the text area or the halftone area, it is determined that the pixel belongs to an edge area. Specific examples of the segmentation process are described in, for example, Japanese Unexamined Patent Publication JP-A 2002-232708 and the like.

Since the density transition in the density distribution of the page-background area is usually monotonous, both of the maximum density difference and the total density busyness are very small. The density transition in the density distribution of the photograph area is smooth and both of the maximum density difference and the total density busyness are small, but slightly greater than ones in the page-background area. In the density distribution of the halftone area, the maximum density difference varies depending upon a halftone, and total density busyness varies based on the number of halftone dots, and therefore the proportion of the total density busyness to the maximum density difference becomes large.

Hence, when a total density busyness is greater than a product of the maximum density difference and the text/halftone determination threshold value (one of the plurality of threshold values), it is determined that the pixel belongs to the halftone area. The maximum density difference in a density distribution of the text area is greats and therefore the total density busyness is also great, however, a transition in density in the text area is less than a transition in that in the halftone area, thus the total density busyness is less than one in the halftone area. Hence, when a total density busyness is less than a product of the maximum density difference and the text/halftone determination threshold value, it is determined that the pixel belongs to the text area.

Thus, the calculated maximum density difference is compared with the maximum density difference threshold value, and the calculated total density busyness is compared with the total density busyness threshold value. In a case where the maximum density difference is less than the maximum density difference threshold value and the total density busyness is less than the total density busyness threshold value, it is determined that the current pixel belongs to the page-background/photograph area, and otherwise determined that the current pixel belongs to the text/halftone area.

Moreover, in the case of being determined as the page-background/photograph area, the calculated maximum density difference is compared with the page-background/photograph determination threshold value. In a case where the maximum density difference is less than the page-background/photograph determination threshold value, it is determined that the pixel belongs to the page-background area, and in a case where the maximum density difference is greater than the page-background/photograph determination threshold value, it is determined that the pixel belongs to the photograph area. In the case of being determined as the text/halftone area, the calculated total density busyness is compared with a product of the maximum density difference and the text/halftone determination threshold value. In a case where the total density busyness is less than the product of the maximum density difference and the text/halftone determination threshold value, it is determined that the pixel belongs to the text area, and in a case where the total density busyness is greater than the product of the maximum density difference and the text/halftone determination threshold value, it is determined that the pixel belongs to the halftone area.

For faithful color reproduction, the color correction section 15 performs a process of removing color impurity based on spectral characteristics of CMY color materials containing an useless absorption component. The processing method includes a method wherein an input RGB signal and an output CMY signal have a corresponding relation as a LUT (lookup table), and a color masking method using the following transformation matrix:

$$\begin{pmatrix} C \\ M \\ Y \end{pmatrix} = \begin{pmatrix} a_{11} & a_{12} & a_{13} \\ a_{21} & a_{32} & a_{23} \\ a_{31} & a_{32} & a_{33} \end{pmatrix} \begin{pmatrix} R \\ G \\ B \end{pmatrix}$$

For example, when the color masking method is used, a plurality sets of RGB data when a color patch having a same L*a*b* value (CIE1976 L*a*b* signal (CIE: Commission International de l'Eclairage, and L*:lightness, a*, b*: chrominance)) as that of a color which is outputted when certain CMY data is given to the image output apparatus 24, is read in the image input apparatus 22, and the CMY data given to the image output apparatus 24 are prepared, and coefficients of the transformation matrix from $a_{11}$ to $a_{33}$ in formula 1 are calculated by these sets, followed by performing color correction process with the calculated coefficients. In order to further improve accuracy, a term of high order of a second order or higher may be added.

The black generation and under color removal section 16 carries out a black generation process in which a black (K) signal is created out of the CMY three-color-signal to which color correction was carried out, and a process in which a new CMY signal is created by removing a part which overlaps with the former CMY signal, and thereby converting the CMY three-color signal into a CMYK four-color-signal.

With respect to image data of the CMYK signal input by the black generation and under color removal section 16, the spatial filter process section 17 carries out a spatial filter process with a digital filter based on the segmentation class signal. By correcting a characteristic of spatial frequency, it is possible to prevent blurring in output images and deterioration of graininess.

For example, a high frequency component in the area segmented as a text area by the segmentation process section 14 is enhanced by an edge enhancement process in the spatial filter process of the spatial filter process section 17 to improve reproducibility of especially a black text or a color text. Further, with respect to the area segmented as a halftone area by the segmentation process section 14, a low-pass filter process is performed to remove an input halftone dot component.

The output tone correction section 18 carries out output tone correction process for converting the signals, such as density signals, into halftone area ratios that are characteristic values of the color image output apparatus 4. With respect to the image data of the CMYK signal, the tone reproduction process section 19 carries out a tone reproduction process so that the image can be reproduced halftone, based on the segmentation class signal.

The image data to which above process has been carried out is temporarily stored in a storage section (not shown), is read at a predetermined timing, and is outputted to the color image output apparatus 4. The color image output apparatus 4 outputs an image on a recording medium (for example, a paper etc.), and examples thereof include a color image output apparatus employing an output system such as an electrophotographic system or an inkjet system, but the color image output apparatus 4 is not limited thereto.

The operation panel 5 is constituted of, for example, a touch panel integrated with a display section, such as a liquid crystal display, and an operating section, such as a setting button, and the like, and based on information inputted from the operation panel by a user, operation of the color image processing apparatus 3, the color image input apparatus 2, and the color image output apparatus 4 are controlled. Note that, the above process is controlled by a CPU (Central Processing Unit: control section, not shown).

Figure 2:
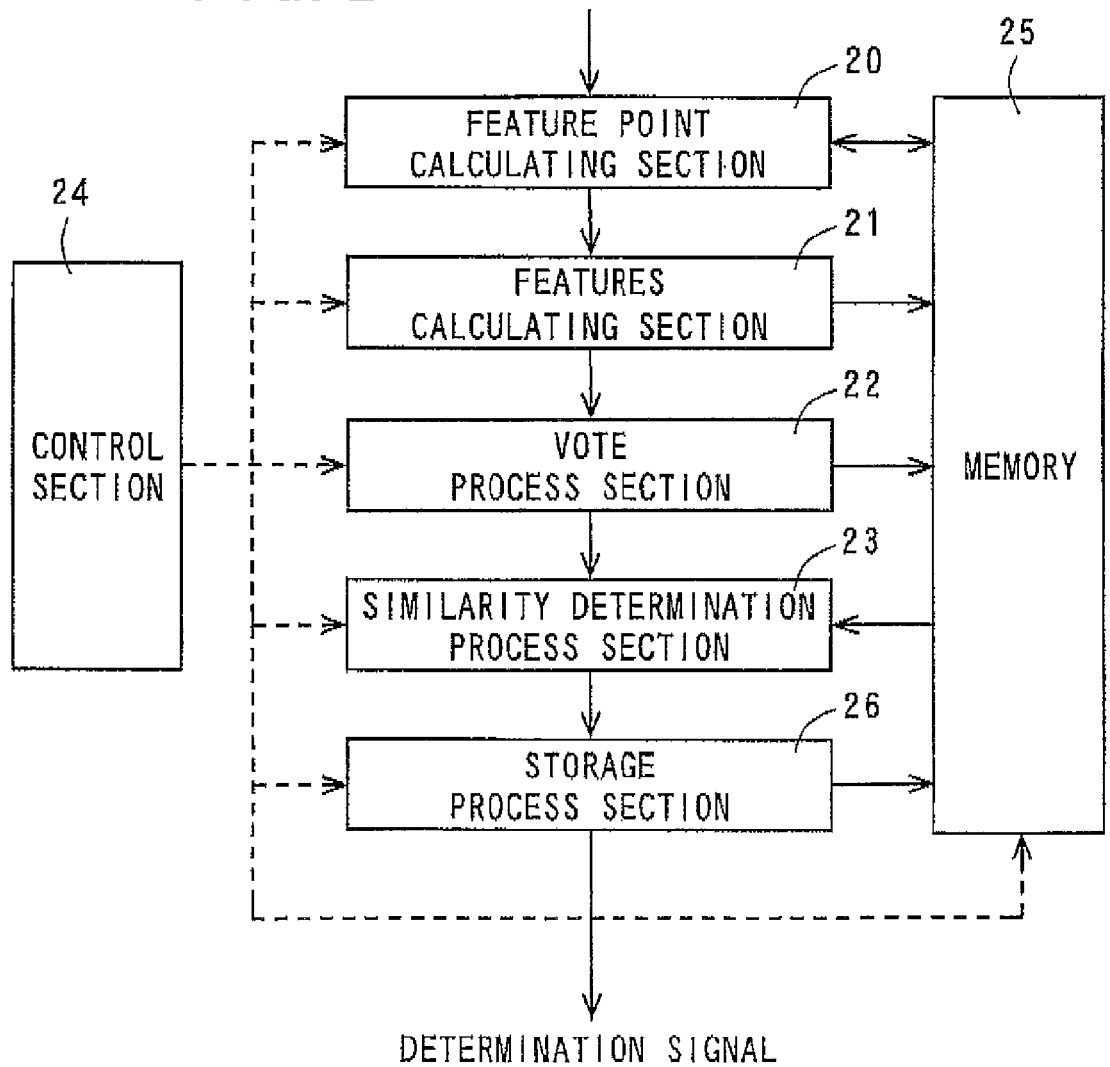
FIG. 2 is a block diagram showing the structure of a document matching process section.

FIG. 2 is a block diagram showing the structure of the document matching process section 12. The document matching process section 12 is provided with a feature point calculating section 20, a features calculating section 21, a vote process section 22, a similarity determination process section 23, a storage process section 26, a control section (CPU) 24, and a memory 25.

The feature point calculating section 20 extracts a connected portion of a text string or ruled line to calculate a centroid in the connected portion as a feature point.

The features calculating section 21 uses the feature point calculated by the feature point calculating section to calculate features (feature vectors) which are invariants with respect to rotation, enlargement, and reduction (an invariant parameter to geometric changes including rotation, translation, and scaling of a document image). An example of calculating method will be described later.

The vote process section 22 uses the calculated features (hash value) to vote for a document image stored in a hash table.

Based on the vote process result by the vote process section 22, the similarity determination process section 23 extracts a document image which has obtained maximum number of votes and the number of votes. The extracted number of votes is compared with a predetermined threshold value to determine a similarity. Alternatively, the extracted number of votes is divided by the maximum number of votes obtained by the document image to be normalized, and the result thereof is compared with the predetermined threshold value. The threshold value in this case is preferably, for example, about 0.8. When the result is not lower than 0.8, it is determined that they are similar to each other. When there is included a handwritten portion, the number of votes can be greater than the maximum number of votes obtained, the similarity can be greater than 1.

The maximum number of votes obtained is represented by multiplying the number of feature points by the number of a hash value calculated from one feature point (current feature point). In the example below, although it is showed that one hash value is calculated from one feature point as the easiest example, by changing a method for selecting feature points around the current feature point, a plurality of hash values can be calculated from one feature point.

For example, when six points are extracted as the feature points around the current feature point, there are six combinations of extracting five points from these six points. In addition, with respect to each of the six combinations, three points can be also extracted from five points to obtain invariants and hash values are calculated.

The storage process section 26 stores hash values for each feature point calculated by the features calculating section 21, and indexes (document ID) indicative of documents (reference images) successively into a hash table (refer to FIG. 16A below) which is provided in a memory. When a hash value has been already stored, a document ID is stored in association with the hash value. When a storage process is performed, processes of the vote process section 22 and the similarity determination process section 23 are bypassed without being performed. On the other hand, when a document matching process is performed, a process of the storage process section 26 is bypassed without being performed.

The control section (CPU) 24 controls accesses to the respective process sections and the memory 25. Note that, the control section 24 may be a same as a control section which controls a whole of the color image processing apparatus 3, and may be a control section specialized in the document matching process.

Figure 3:
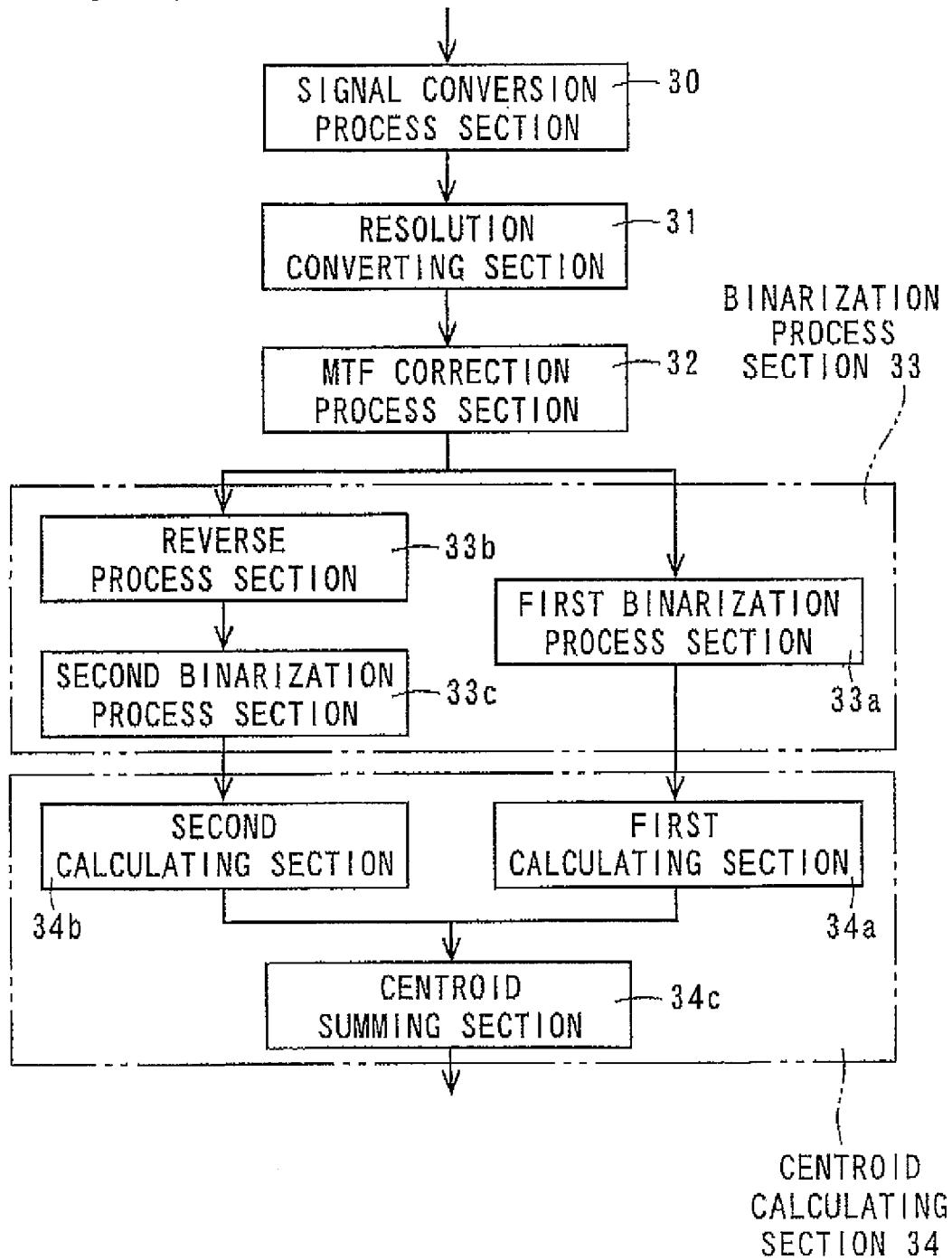
FIG. 3 is a block diagram showing the structure of a feature point calculating section.

FIG. 3 is a block diagram showing the structure of the feature point calculating section 20.

The feature point calculating section 20 includes a signal conversion process section 30, a resolution converting section 31, an MTF correction process section 32, a binarization process section 33, and a centroid calculating section 34.

When input image data is a color image, the signal conversion process section 30 achromatizes the image data to convert it into a lightness or luminance signal.

For example, based on RGB image data, a luminance Y is obtained by following expression (1):

$$Y_j = 0.30R_j + 0.59G_j + 0.11B_j \tag{1}$$

(wherein, $Y_j$ is a luminance value of each pixel, and $R_j$, $G_j$, and $B_j$ are color components of each pixel).

Moreover, the lightness L* may be obtained by converting the RGB image data into CIE1976 L*a*b* image data.

When input image data is optically zoomed in the color image input apparatus 2, the resolution converting section 31 zooms the image data again so as to have a predetermined resolution. Further, in the resolution converting section 31, resolution conversion to reduce resolution than resolution which is read at the time of the same magnification in the color image input apparatus 2 is also performed in order to enhance throughput in the subsequent steps.

The MTF correction process section 32 is used to absorb that spatial frequency characteristic in the color image input apparatus 2 is different for each model, and applies an appropriate filter process (enhancement process) to thereby perform a process of restoring the blurring caused by deterioration of the MTF. Moreover, the MTF correction process section 32 is also used to suppress a high-frequency component which is unnecessary for the process of extracting feature points. That is, a mixing filter as shown in FIG. 4 is used to perform enhancement and smoothing process.

The binarization process section 33 is provided with a first binarization process section 33a for generating binary image data suitable for centroid calculation from the achromatized image data, a reverse process section 33b for reversing the achromatized image data, and a second binarization process section 33c for generating binary image data for the reversed image data.

Each pixel of a line block to be binarized is used as a threshold value for binarization, so that pixel value averaging in a target wide area is realized only in a limited storage area. When image data is 8 bits (256 tones), a luminance Yj' of image data (hereinafter, referred to as reversed image data) which is obtained by reversing achromatized image data (hereinafter, referred to as non-reversed image data) is calculated by the following expression: Yj'=255−Yj.

The first and second binarization process sections 33a and 33c have same process contents, and binarize image data by comparing a luminance value or a lightness value of the non-reversed image data and the reversed image data with a threshold value.

Figure 5:
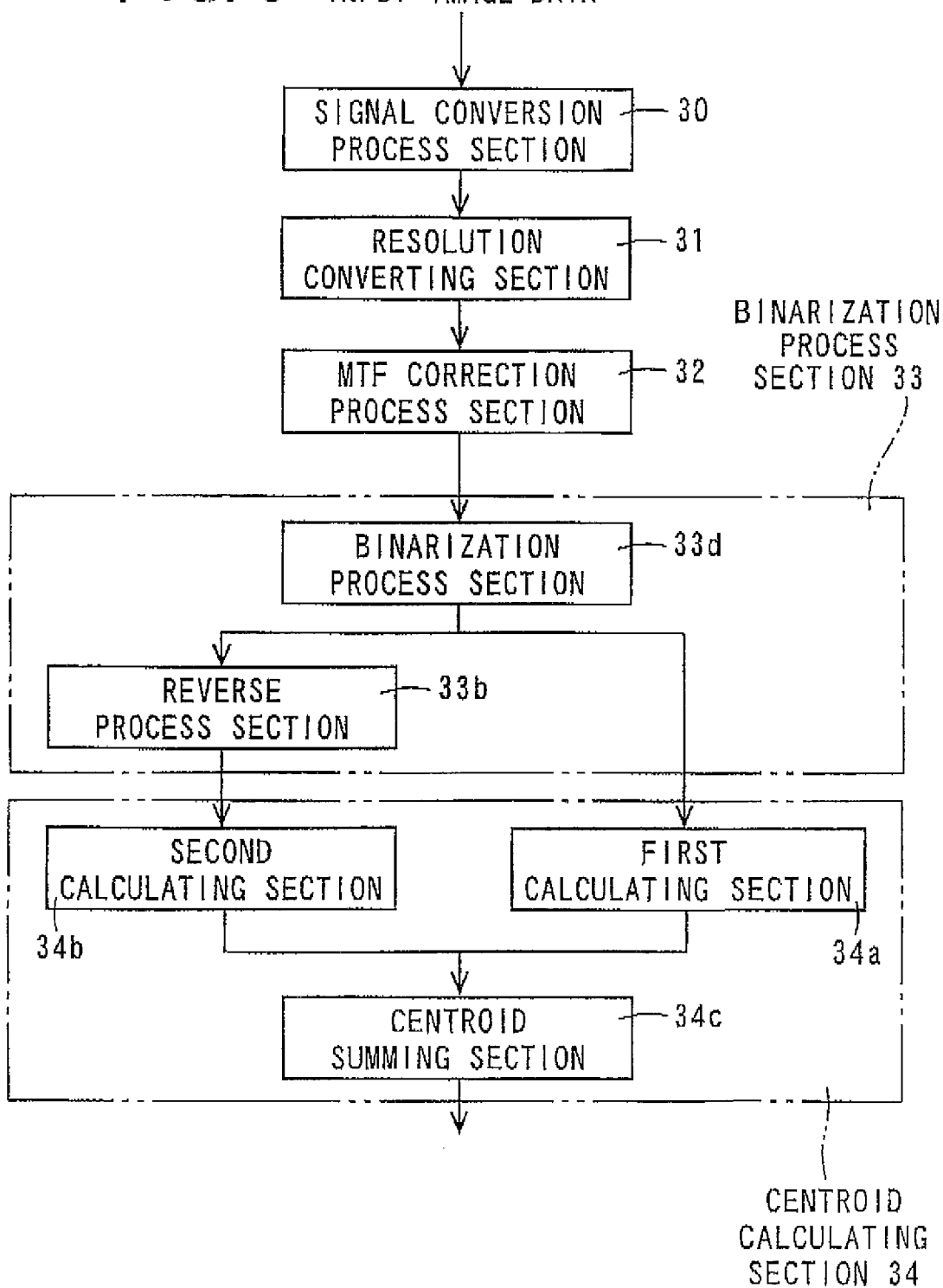
FIG. 5 is a block diagram showing another structure of the feature point calculating section.
Figure 6:
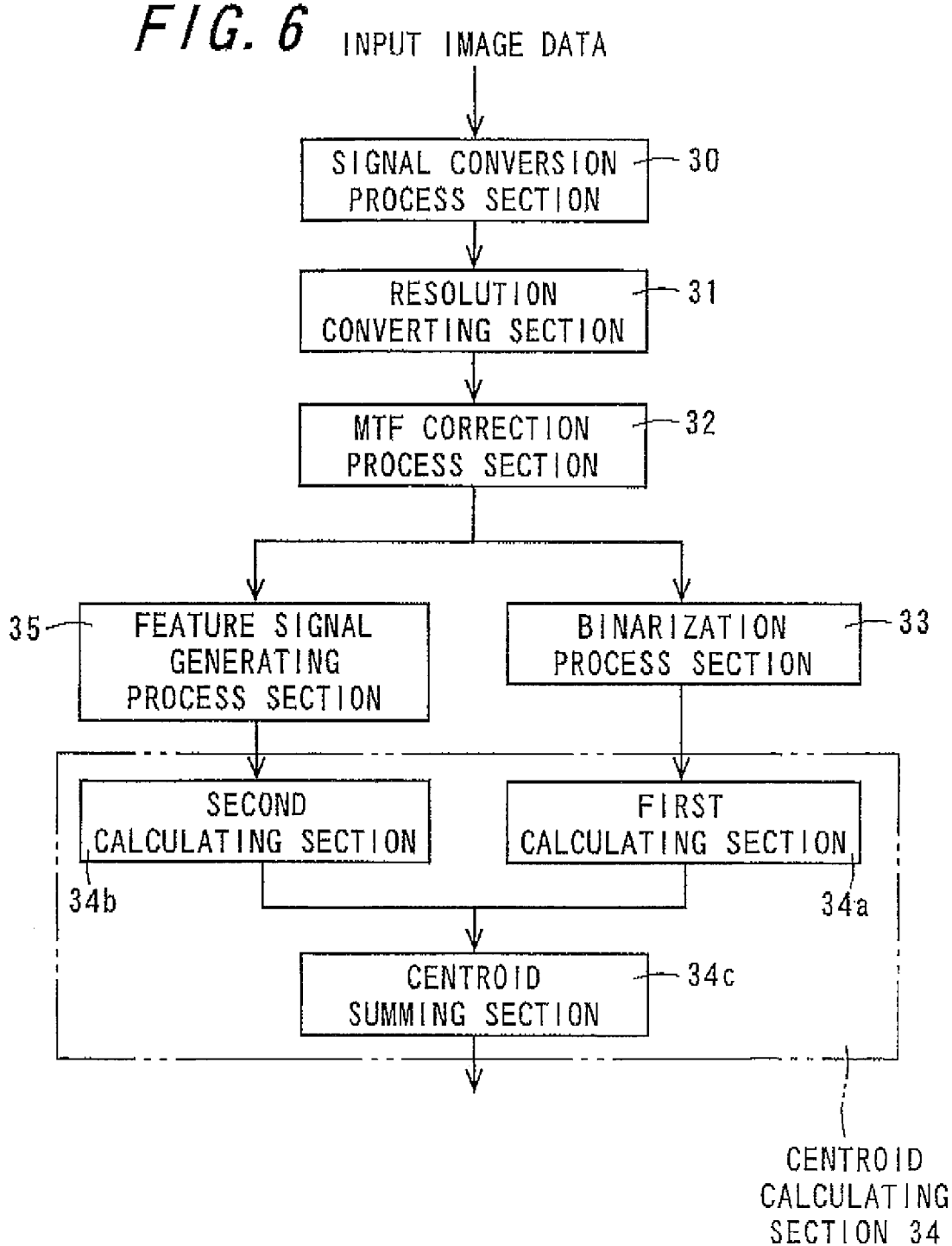
FIG. 6 is a block diagram showing another structure of the feature point calculating section.

FIGS. 5 and 6 are block diagrams showing another structure of the feature point calculating section 20. The structure is same as the structure shown in FIG. 3 except for the structure of the binarization process section 33, and description thereof will be omitted. In another structure of the feature point calculating section 20 shown in FIG. 5, binarization is performed by a binarization process section 33d and thereafter reverse process is performed by the reverse process section 33b. Moreover, in another structure of the feature point calculating section 20 shown in FIG. 6, a feature signal generating process section 35 for generating a feature signal for a reverse text may be provided instead of the reverse process section 33b and the second binarization process section 33c shown in FIG. 3.

The centroid calculating section 34 obtains a centroid of a consecutive component from binarized image data to output the obtained centroid to the features calculating section 21 as a feature point.

The centroid calculating section 34 includes a first calculating section 34a for performing calculation of a centroid for non-reversed image data, a second calculating section 34b for performing calculation of a centroid for reversed image data, and a centroid summing section 34c for summing (adding) the centroids calculated by the first calculating section 34a and the second calculating section 34b.

Figure 7:
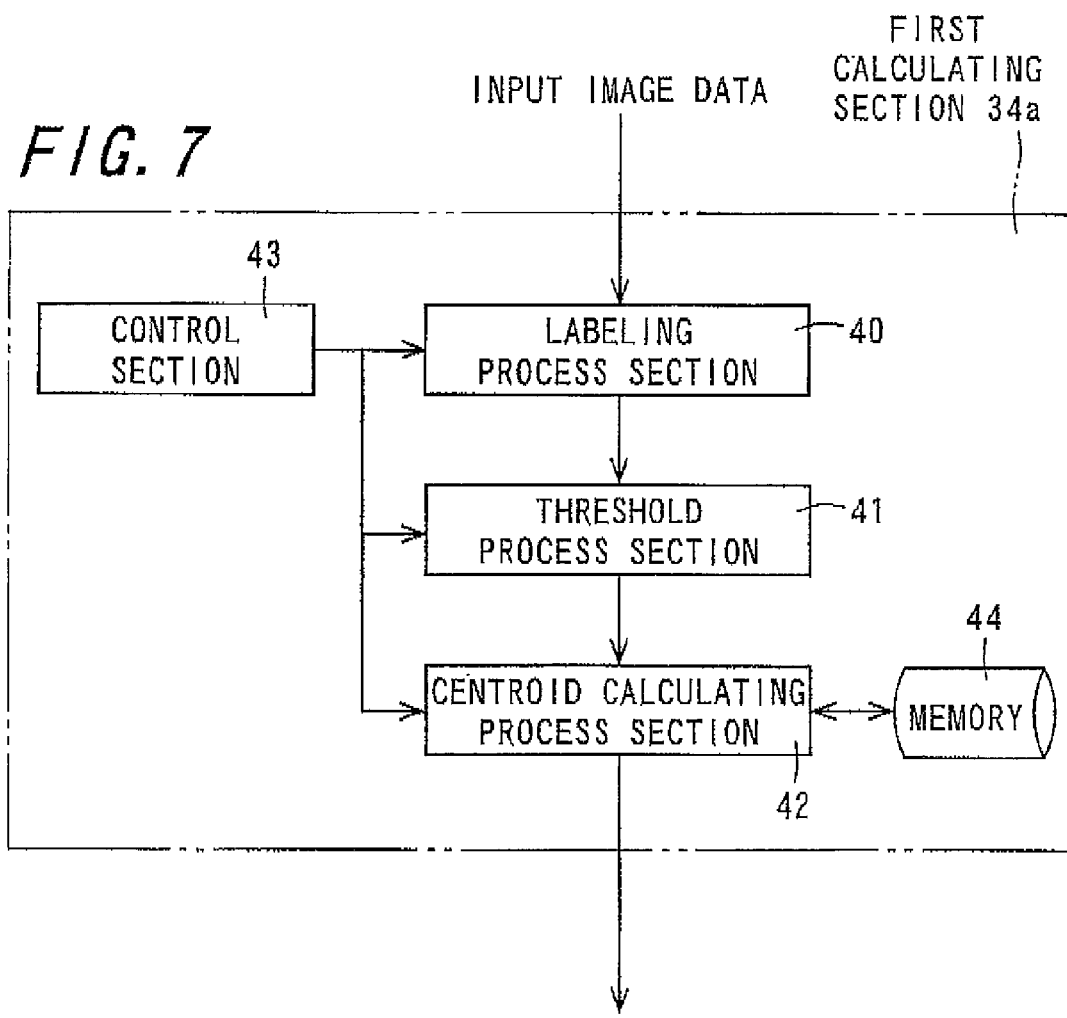
FIG. 7 is a block diagram showing the structure of a first calculating section.

FIG. 7 is a block diagram showing the structure of the first calculating section 34a. Note that, since the first calculating section 34a and the second calculating section 34b have the same structure, the first calculating section 34a will hereinafter be described.

The first calculating section 34a is provided with a labeling process section 40, a threshold process section 41, a centroid calculating process section 42, a control section 43, and a memory 44.

The labeling process section 40, for example, extracts two-line image data and performs labeling for a current pixel for each line based on the following procedure.

Figures 8, 9:
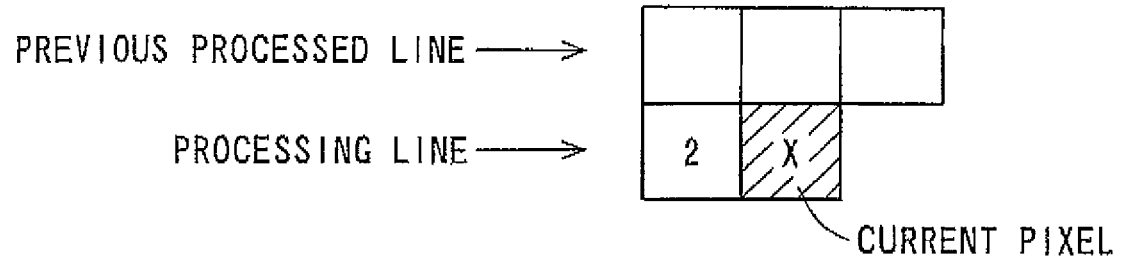
FIG. 8 is a view illustrating positions of a current pixel and four pixels adjacent thereto.
FIG. 9 is a view showing an example of a label equivalent table.

First, with respect to a current pixel, as shown in FIG. 8, tour pixels (left, upper left, upper, and upper right) adjacent to the current pixel X are examined. When all of the pixels adjacent to the current pixel are not labeled, unused label is applied to the current pixel. When the pixels adjacent to the current pixel are applied with a same label, the same label is applied to the current pixel. When the pixels adjacent to the current pixel are applied with different labels, the oldest label of all is applied to the current pixel (merging) and what these labels are same is recorded into a label equivalent table as shown in FIG. 9.

Further, simultaneously with labeling, a coordinate value of the current pixel is accumulatively added to a buffer corresponding to a given label. Note that, the adding result of the x coordinate, the adding result of the y coordinate, frequency of adding to each label (the number of pixels), and flags for each label used for determination are stored in the buffer. Here, kinds of the flag include "null", "no update", and "update". When a process for a certain line is completed and a process for the next line is performed, a flag of each label is initialized to be in the state of "no update". In a case where a flag of a certain label is in the state of "no update" when the process of a line is completed, it is meant that a connected portion is finished. At this time, the label is released so as to be usable again, that is, the flag becomes in the state of "null".

With respect to a label in which no coordinate value is added when one-line process is completed (label with its flag being "no update"), a consecutive component will not be continued to subsequent lines, and thus centroid calculation determination is performed in the threshold process section 41.

The threshold process section 41 compares the number of pixels of a target label and a threshold value to determine whether or not centroid calculation is performed. When the number of pixels of the target label falls within a range of the following expression, the centroid calculation is performed. When being out of the range, the centroid calculation is not performed:

$$TH\_L\_\text{LIMIT} < (\text{the number of pixels of a target label}) < TH\_H\_\text{LIMIT}$$

For example, 100 is set as the threshold "TH_L_LIMIT" in order to remove noise components such as isolated points. Moreover, the value is set so that a small consecutive component in a reverse text is not detected as far as possible.

As an example of the threshold "TH_H_LIMIT", for example, 4096 is set in the case of a document with a resolution of 300 dpi. The upper limit of the threshold depends on a resolution and a size of a text. The value is set so that a wide range area in a reverse text is not detected.

Note that, these thresholds may be set in advance as values that a reverse text can be detected appropriately, using various kinds of image samples.

The centroid calculating process section 42 divides the accumulatively added coordinate value by the added number of pixels to obtain a centroid.

Selection of process modes (reverse text document mode) may be performed at the time of reading a document image, without obtaining reversed image data for a10 document images. The selection of process modes can be performed from the operation panel 5.

Instead of performing the selection of a process mode, when a document is set (may be set either on a scanner platen or by an ADF (auto document feeder)), questions such as whether or not the document includes an outline text (reverse text) may be displayed on a display section of the operation panel in an interactive manner so that a process is urged to a user.

FIGS. 10A to 10E are diagrams showing examples of questions in an interactive manner displayed on the operation panel 5. The question is made by indicating whether a document mode is a normal text document mode or a reverse text document mode with only a text (FIG. 10A) or with an image example (FIG. 10B).

Moreover, the image example may be displayed only when the "detail" is selected (FIG. 10C). When the detail of the normal text is selected, an example of a normal text is displayed and a question is made about whether or not the text as in the example is contained (FIG. 10D). When the detail of the reverse text is selected, an example of a reverse text is displayed and a question is made about whether or not the text as in the example is contained (FIG. 10E).

In addition, a process mode, including a normal text document mode or a reverse text document mode, may be set automatically by detecting a document mode automatically.

Figure 11:
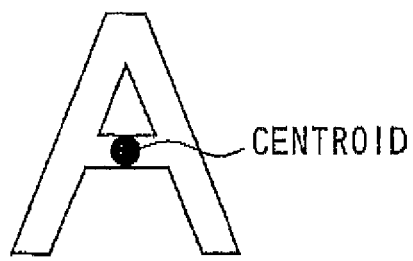
FIG. 11 is an illustrative view showing an example of a feature point in a consecutive component.

FIG. 11 is an illustrative view showing an example of a feature point in a consecutive component. In FIG. 11, a specified consecutive component is a text "A", which is specified as a group of pixels to which a same label is applied. A feature point (centroid) of the text "A" is at the position indicated by a black circle (x coordinate, y coordinate) in FIG. 11.

Figure 12:
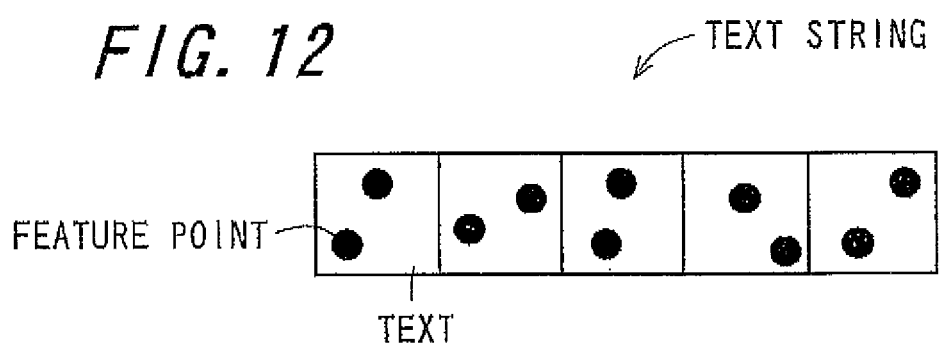
FIG. 12 is an illustrative view showing an example of the result of extracting a feature point in a text string.

FIG. 12 is an illustrative view showing an example of the result of extracting a feature point in a text string. When a text string is composed of a plurality of texts, a plurality of feature points each of which has a different coordinate depending on a type of the text are extracted.

Figure 13:
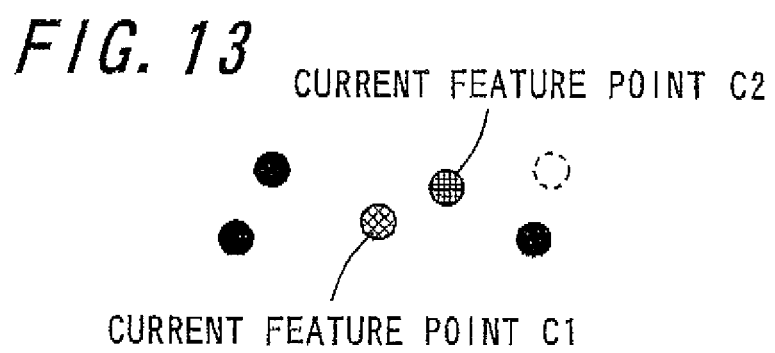
FIG. 13 is a view showing an example of a current feature point and surrounding feature points.

The features calculating section 21 selects a predetermined feature point out of the plurality of extracted feature points and calculates a hash value. For example, as shown in FIG. 13, four feature points around a current feature point C1 are extracted in the order of nearer distance therefrom, three feature points are selected out of the extracted surrounding four feature points, and a remainder is obtained by the following expression, wherein the remainder is defined as a hash value Hi (i=1, 2, . . . , N; N is the number of feature points).

In the case of the example shown in FIGS. 14A to 14F, for each of current feature points C1 and C2, three kinds of invariants of FIGS. 14A to 14C and FIGS. 14D to 14F are obtained. In the present embodiment, an invariant is a ration of two lengths of line segments connecting surrounding feature points and invariants are represented as H1$j$ and H2$j$ (j=1, 2, 3). The lengths of line segments are calculated based on coordinate values of each of the surrounding feature points. For example, in the example shown in FIG. 14A, when a length of a line segment connecting a feature point c and a feature point d is defined as A11 and a line segment connecting the feature point c and a feature point b is defined as B11, an invariant H11 is obtained by the following expression: H11=A11/B11. Also in FIGS. 14B, 14C, and 14D to 14F, a line segment is defined and an invariant is obtained in the same way as shown in FIG. 14A.

$$Hi=(Hi1\times10^2+Hi2\times10^1+Hi3\times10^0)/D$$

(wherein, D is a constant which is determined depending on a number of remainder, and i is a natural number)

For example, when D is set at "10", the remainder is "0" to "9", which is a range that the calculated hash value can take.

Moreover, as a method for calculating an invariant by current feature points C1 and C2, for example, as shown in FIGS. 15A to 15H, tour kinds of invariant H1$j$ in FIGS. 15A to 15D and four kinds of invariant H2$j$ in FIGS. 15E to 15H (j=1, 2, 3, 4) may be obtained. In this case, the hash value Hi is calculated by the following expression:

$$Hi=(Hi1\times10^3+Hi2\times10^2+Hi3\times10^1+Hi4\times10^0)/E.$$

When a document image is stored, a storage mode is selected in the operation panel, and as shown in FIGS. 16 A and 16B, a hash value and an index indicative of a document (IDk) are stored into a hash table. As shown in FIG. 16B, when hash values are equal (H1=H5), two entries in the hash table can be integrated into one.

In a document image containing a reverse text, a hash value and an index may be stored into a hash table different from one for a document image containing no reverse text. Thereby, at the time of performing matching determination, the retrieved object can be separated depending on a document mode (normal text document, reverse text document and the like), resulting that it is possible to improve process speed and determination accuracy.

The vote process section 22 retrieves a hash table stored in the memory 25 based on a hash value (features) calculated by the features calculating section 21, and votes for a document in an index stored for the hash value. The accumulation result of the vote is outputted to the similarity determination process section 23.

The similarity determination process section 23 determines a similarity of a document (an image, a document image) based on the voting result inputted from the vote process section 22, and outputs a determination result (a classification signal). More specifically, the similarity determination process section 23 compares the number of votes (the number of votes obtained) inputted from the vote process section 22 with a predetermined threshold value, and when the number of votes is equal to or more than the threshold value, the input image is determined to be similar to documents stored in advance, and further the document with the most number of votes is determined as a matching document. A classification signal to perform a predetermined process (for example, copy inhibition, storing into a predetermined folder and the like) corresponding to the stored document is outputted depending on the determination result. Moreover, when the number of votes inputted from the vote process section 22 is less than the threshold value, the similarity determination process section 23 determines that there is no similar document and outputs the result thereof. This determination method is one of examples, and other methods including a method for performing determination of a similarity and matching by dividing the number of votes obtained by the maximum number of votes for each document (for example, the number of feature points obtained for each document) to normalize.

FIG. 17 is a flowchart showing the document matching process.

At step S1, the feature point calculating section 20 carries out a feature point calculating process for an input image, and at step S2, the features calculating section 21 calculates a predetermined invariant based on the feature point inputted from the feature point calculating section 20, and calculates a hash value as features based on the calculated invariant.

At step S3, it is determined whether or not a process for a10 lines is completed, and when the process is completed, the procedure proceeds to step S4, and when the process is not completed, the procedure goes back to step S1.

At step S4, the vote process section 22 retrieves a hash table based on the hash value calculated by the features calculating section 21, votes for a document in an index stored in association with the hash value, and accumulatively adds the vote.

At step S5, the similarity determination process section 23 compares the number of votes inputted from the vote process section 22 with a predetermined threshold value, and when the number of votes is equal to or more than the threshold value, the input image is determined to be similar to a document stored in advance, and when the number of votes is less than the threshold value, the input image is not determined to be similar to the document stored in advance.

At step S6, judging from the determination result, and when there is a similar image, the procedure proceeds to step S7, and a determination signal of "1" is outputted. When there is no similar image, a determination signal of "0" is outputted at step S8.

Figure 18:
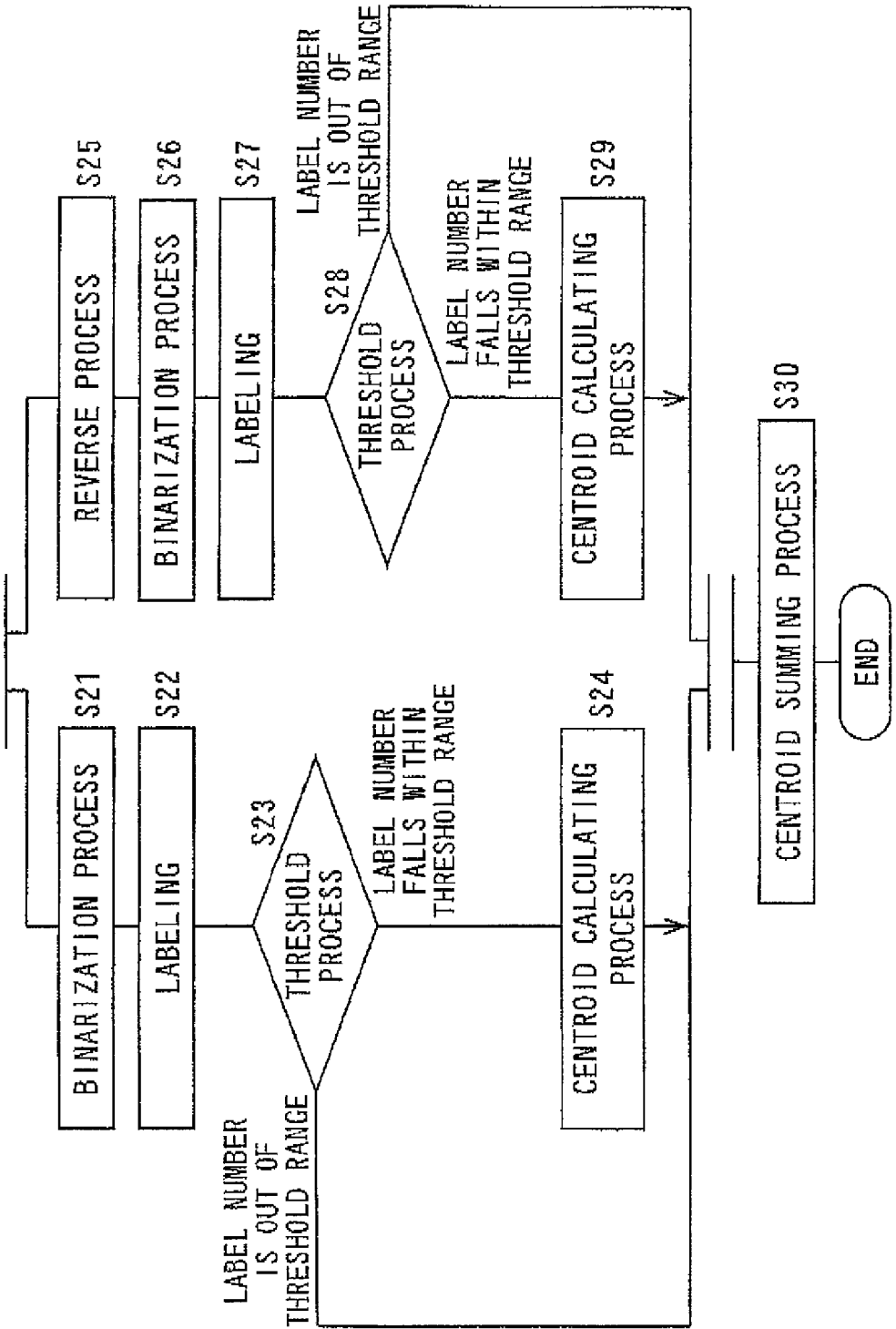
FIG. 18 is a flowchart showing a feature point calculating process.

FIG. 18 is a flowchart showing the feature point calculating process.

As to a normal text, a binarization process is performed at step S21 and labeling is performed at step S22. When a label number is out of a threshold range at a threshold process of step S23, the procedure proceeds to step S30, and when it falls within the ranger the procedure proceeds to step S24. At step S24, centroid calculating process is performed.

As to a reverse text, a reverse process is performed at step S25, a binarization process is performed at step S26, and labeling is performed at step S27. When a label number is out of a threshold range at a threshold process of step S28, the procedure proceeds to step S30, and when it falls within the range, the procedure proceeds to step S29. At step S29, centroid calculating process is performed. At step S30, obtained centroids are summed.

FIG. 19 is a block diagram showing the structure of an image reading apparatus 6 (flat bed scanner) according to an embodiment of the invention.

As shown in FIG. 19, the image reading apparatus 6 includes the color image input apparatus 2 and a color image processing apparatus 7.

The color image processing apparatus 7 includes the A/D conversion section 10, the shading correction section 11, and the document matching process section 12.

The analogue signal read by the color image input apparatus 2 is transmitted, in the color image processing apparatus 7, to the A/D conversion section 10, the shading correction section 11, and the document matching process section 12 in this order. Since each section is the same as one in the embodiment above, description thereof will be omitted.

Data read from a document image and a determination signal (or features) are transmitted to a printer, a multi-function peripheral, and a server through a network. Alternatively, they are inputted into a printer through a computer, or inputted directly into a printer. In this case, the printer, the multi-function peripheral, the server, and the computer need to be provided so as to be able to process the data of the document image and the determination signal (or the features).

As another embodiment of the invention, an image processing method for performing document matching and output control as describe above may be recorded on a computer readable recording medium on which a program code of a program (an executable program, an intermediate code program, a source program) executed by a computer is recorded. As a result, it is possible to provide a portable recording medium on which a program code for carrying out the image processing method for performing document matching and output control is recorded.

The recording medium may be a memory for performing process in a microprocessor, for example, a ROM itself, or a recording medium which can be read by inserting it to a program reading apparatus which is provided as an external storage section 74 of a computer.

In either cases the recorded program code may be executed by the access of the microprocessor to the recording medium, or by reading the program code out of the recording medium by the microprocessor and downloading the read program code to a program storage area. Note that, the program for download is stored in a predetermined storage apparatus in advance. The microprocessor such as a CPU performs overall control of the respective sections in a computer so that predetermined image process is performed according to the installed program code.

Further, the recording medium which is readable with the program reading apparatus may be a medium on which a program code fixedly is recorded, including tapes such as a magnetic tape and a cassette tape; discs such as a magnetic disc including a flexible disc and a hard disc, and an optical disc including a CD-ROM (Compact Disc-Read Only Memory), MO (Magneto Optical disc), MD (Mini Disc) and DVD (Digital Versatile Disc); cards such as an IC (Integrated Circuit) card (including a memory card) and an optical card; and a semiconductor memory such as a mask ROM, an EPROM (Erasable Programmable Read Only Memory), an EEPROM (Electrically Erasable Programmable Read Only Memory), and a flash ROM.

Further, a medium which is configured so as to be connectable to a communication network including Internet, and on which a program code is carried in a flowing manner so as to download the program code from the communication network is also applicable. Note that, when the program code is downloaded from the communication network in this way, the program for download may be stored in a computer in advancer or installed from another recording medium. Note that, the invention can be carried out when the program code is in a form of a computer signal embedded in a carrier wave that is realized by electronic transmission.

An example of the computer system which executes an image processing program read from a recording medium includes a system which is constituted in such a manner that an image reading apparatus such as a flatbed scanner, a film scanner, and a digital camera, a computer for performing a variety of process including the image processing method by executing various kinds of programs, an image display device such as a CRT (Cathode Ray Tube) display and a liquid crystal display for displaying process results of the computer thereon, and an image output apparatus such as a printer for outputting the process results of the computer on a paper and the like, are mutually connected. Further, the computer system is connected to a server and the like through the communication network, and is provided with a network card, a modem and the like for transmitting and receiving a variety of program codes including the image processing program and a variety of data such as image data.

The invention may be embodied in other specific forms without departing from the spirit or essential characteristics thereof. The present embodiments are therefore to be considered in a10 respects as illustrative and not restrictive, the scope of the invention being indicated by the appended claims rather than by the foregoing description and a10 changes which come within the meaning and the range of equivalency of the claims are therefore intended to be embraced therein.

What is claimed is:

1. An image processing apparatus comprising:
a first feature point calculator configured to specify a consecutive component in which pixels are connected based on document image data, and to extract a centroid of the specified consecutive component as a feature point;
an invert processor configured to obtain image data that a pixel value of the document image data is inverted;
a second feature point calculator configured to specify a consecutive component in which pixels are connected based on the image data that the document image data is inverted, and to extract a centroid of the specified consecutive component as a feature point;
a feature point adder configured to add the centroid calculated by the first feature point calculator and the centroid calculated by the second feature point calculator;
a features calculator configured to obtain features of the document image data based on the centroid added in the feature point adder;
a memory configured to store in advance the calculated features and the document image in association with each other; and
a similarity determining component configured to determine, based on the features obtained by the features calculator and features of a document image which has been stored in advance, whether or not the document image and the stored document image are similar to each other.

2. The image processing apparatus of claim 1, wherein the memory is configured to store the features obtained by the first and second feature point calculators differently from features calculated based on centroids obtained without inverting the document image.

3. The image processing apparatus of claim 1, wherein the similarity determining component is configured to perform the determination based on a signal indicating whether or not the image data that the document image data is inverted is used.

4. The image processing apparatus of claim 1, further comprising a controller configured to control, based on the determination result from the similarity determining component, processing contents with respect to the document image data, including copying, electronic distribution, facsimile transmission, and a filing of the document image data.

5. An image forming apparatus including the image processing apparatus of claim 1.

6. An image reading apparatus including the image processing apparatus of claim 1.

7. An image processing method comprising:
- a first feature point calculating step of specifying a consecutive component in which pixels are connected based on document image data, and extracting a centroid of the specified consecutive component as a feature point;
- an invert process step of obtaining image data that a pixel value of the document image data is inverted;
- a second feature point calculating step of specifying a consecutive component in which pixels are connected based on the image data that the document image data is inverted, and extracting a centroid of the specified consecutive component as a feature point;
- a feature point adding step of adding the centroid calculated at the first feature point calculating step and the centroid calculated at the second feature point calculating step;
- a features calculating step of obtaining features of the document image data based on the feature point added at the feature point adding step; and
- a similarity determining step of determining, based on the features obtained at the features calculating step and features of a document image which has been stored in advance, whether or not the document image and the stored document image are similar to each other.

8. A non-transitory computer-readable medium with computer-executable instructions embodied thereon that, when executed, cause the computer to function as the image processing apparatus of claim 1.

* * * * *